United States Patent
Bloch et al.

(10) Patent No.: US 8,644,140 B2
(45) Date of Patent: Feb. 4, 2014

(54) DATA SWITCH WITH SHARED PORT BUFFERS

(75) Inventors: Gil Bloch, Zichron Yaakov (IL); Diego Crupnicoff, Buenos Aires (AR); Michael Kagan, Zichron Yaakov (IL); Ido Bukspan, Herzliya (IL); Alon Webman, Tel Aviv (IL); Itamar Rabenstein, Petach Tikva (IL)

(73) Assignee: Mellanox Technologies Ltd., Yokneam (IL)

( * ) Notice: Subject to any disclaimer, the term of this patent is extended or adjusted under 35 U.S.C. 154(b) by 643 days.

(21) Appl. No.: 12/876,265

(22) Filed: Sep. 7, 2010

(65) Prior Publication Data

US 2011/0058571 A1 Mar. 10, 2011

Related U.S. Application Data

(60) Provisional application No. 61/240,674, filed on Sep. 9, 2009.

(51) Int. Cl.
*H04L 5/12* (2006.01)

(52) U.S. Cl.
USPC .......................................... 370/229; 370/371

(58) Field of Classification Search
None
See application file for complete search history.

(56) References Cited

U.S. PATENT DOCUMENTS

| | | | | |
|---|---|---|---|---|
| 5,367,520 A | * | 11/1994 | Cordell | 370/395.71 |
| 5,574,885 A | * | 11/1996 | Denzel et al. | 711/165 |
| 6,160,814 A | * | 12/2000 | Ren et al. | 370/427 |
| 6,456,590 B1 | * | 9/2002 | Ren et al. | 370/229 |
| 6,490,248 B1 | | 12/2002 | Shimojo | |
| 6,535,963 B1 | * | 3/2003 | Rivers | 711/149 |
| 6,539,024 B1 | | 3/2003 | Janoska et al. | |
| 6,606,666 B1 | | 8/2003 | Bell, Jr. et al. | |
| 6,895,015 B1 | * | 5/2005 | Chiang et al. | 370/429 |
| 6,922,408 B2 | * | 7/2005 | Bloch et al. | 370/389 |
| 7,088,713 B2 | * | 8/2006 | Battle et al. | 370/389 |
| 7,136,381 B2 | * | 11/2006 | Battle et al. | 370/389 |
| 7,327,749 B1 | | 2/2008 | Mott | |
| 7,590,058 B1 | | 9/2009 | Cherchali et al. | |

(Continued)

FOREIGN PATENT DOCUMENTS

EP 1698976 A1 * 9/2006
WO 03024033 A1 3/2003

OTHER PUBLICATIONS

Raatikainen, P., "ATM Switches—Switching Technology S38.3165", Switching Technology, L8-1, 2006 (http://www.netlab.hut.fi/opetus/s383165).

(Continued)

*Primary Examiner* — Ayaz Sheikh
*Assistant Examiner* — Faiyazkhan Ghafoerkhan
(74) *Attorney, Agent, or Firm* — D. Kligler I.P. Services Ltd.

(57) ABSTRACT

A communication apparatus includes a plurality of switch ports, each switch port including one or more port buffers for buffering data that traverses the switch port. A switch fabric is coupled to transfer the data between the switch ports. A switch control unit is configured to reassign at least one port buffer of a given switch port to buffer a part of the data that does not enter or exit the apparatus via the given switch port, and to cause the switch fabric to forward the part of the data to a destination switch port via the at least one reassigned port buffer.

21 Claims, 2 Drawing Sheets

(56) References Cited

U.S. PATENT DOCUMENTS

| | | | |
|---|---|---|---|
| 7,609,636 B1 | 10/2009 | Mott | |
| 7,773,622 B2 | 8/2010 | Schmidt et al. | |
| 7,853,738 B2* | 12/2010 | Pothireddy et al. | 710/52 |
| 7,936,770 B1* | 5/2011 | Frattura et al. | 370/412 |
| 8,270,295 B2* | 9/2012 | Kendall et al. | 370/230 |
| 8,274,971 B2* | 9/2012 | Battle et al. | 370/357 |
| 2001/0043564 A1* | 11/2001 | Bloch et al. | 370/230 |
| 2002/0012340 A1* | 1/2002 | Kalkunte et al. | 370/360 |
| 2002/0012341 A1* | 1/2002 | Battle et al. | 370/378 |
| 2002/0027908 A1* | 3/2002 | Kalkunte et al. | 370/389 |
| 2002/0136211 A1* | 9/2002 | Battle et al. | 370/389 |
| 2003/0048792 A1* | 3/2003 | Xu et al. | 370/400 |
| 2003/0076849 A1* | 4/2003 | Morgan et al. | 370/412 |
| 2003/0095560 A1* | 5/2003 | Arita et al. | 370/431 |
| 2003/0118016 A1* | 6/2003 | Kalkunte et al. | 370/389 |
| 2003/0137939 A1 | 7/2003 | Dunning et al. | |
| 2003/0198231 A1* | 10/2003 | Kalkunte et al. | 370/395.31 |
| 2003/0198241 A1* | 10/2003 | Putcha et al. | 370/419 |
| 2003/0200330 A1* | 10/2003 | Oelke et al. | 709/238 |
| 2004/0066785 A1* | 4/2004 | He et al. | 370/395.21 |
| 2005/0135356 A1 | 6/2005 | Muthukrishnan et al. | |
| 2005/0259574 A1 | 11/2005 | Figueira et al. | |
| 2006/0155938 A1* | 7/2006 | Cummings et al. | 711/149 |
| 2006/0182112 A1* | 8/2006 | Battle et al. | 370/392 |
| 2007/0025242 A1* | 2/2007 | Tsang | 370/229 |
| 2009/0003212 A1 | 1/2009 | Kwan et al. | |
| 2009/0010162 A1* | 1/2009 | Bergamasco et al. | 370/235 |
| 2009/0161684 A1* | 6/2009 | Voruganti et al. | 370/412 |
| 2009/0196303 A1* | 8/2009 | Battle et al. | 370/403 |
| 2010/0100670 A1 | 4/2010 | Jeddeloh | |

OTHER PUBLICATIONS

Fahmy, S., "A Survey of ATM Switching Techniques", Department of Computer and Information Science, The Ohio State University, USA, Aug. 21, 1995 (http://www.cs.purdue.edu/homes/fahmy/cis788.08Q/atmswitch.html).

Ravid et al., U.S. Appl. No. 13/802,926, filed Mar. 14, 2013.

U.S. Appl. No. 13/189,593 Office Action dated Jul. 9, 2013.

U.S. Appl. No. 13/189,593 Notice of Allowance dated Nov. 25, 2013.

\* cited by examiner

DATA SWITCH WITH SHARED PORT BUFFERS

CROSS-REFERENCE TO RELATED APPLICATIONS

This Application claims the benefit of U.S. Provisional Patent Application 61/240,674, filed Sep. 9, 2009, whose disclosure is incorporated herein by reference.

FIELD OF THE INVENTION

The present invention relates generally to data switching, and particularly to methods and systems for flexible buffering of data in data switches.

BACKGROUND OF THE INVENTION

Data switches constitute the core of common Ethernet switches, IP routers, multiservice platforms, various transmission network elements and legacy communication equipment. Buffering within the switches normally serves to resolve problems like congestion and contention among switch ports. Various buffering schemes have been developed for this purpose. For example, U.S. Patent Application Publication 2006/0155938, whose disclosure is incorporated herein by reference, describes a shared-memory switch fabric architecture. A shared memory has a plurality of receive ports and a plurality of transmit ports. A memory includes a plurality of memory banks organized in rows and columns. Non-blocking receive crossbar circuitry is operable to connect any of the receive ports with any of the memory banks. Non-blocking transmit crossbar circuitry is operable to connect any of the memory banks with any of the transmit ports. Buffering is operable to decouple operation of the receive and transmit ports from operation of the memory array. Scheduling circuitry is operable to control interaction of the ports, crossbar circuitry, and memory array to effect storage and retrieval of the data segments in the shared memory.

SUMMARY OF THE INVENTION

An embodiment of the present invention that is described herein provides a communication apparatus, including:

a plurality of switch ports, each switch port including one or more port buffers for buffering data that traverses the switch port;

a switch fabric, which is coupled to transfer the data between the switch ports; and a switch control unit, which is configured to reassign at least one port buffer of a given switch port to buffer a part of the data that does not enter or exit the apparatus via the given switch port, and to cause the switch fabric to forward the part of the data to a destination switch port via the at least one reassigned port buffer.

In some embodiments, the given switch port is configurable to operate in a pass-through mode and in a loop-back mode, such that in the pass-through mode the given switch port is connected to convey some of the data into and out of the apparatus, and in the loop-back mode the given switch port is available for buffering the part of the data that does not enter or exit the apparatus via the given switch port. In an embodiment, the given switch port is further configurable to operate in a mixed mode, in which the given switch port is connected to convey a portion of the data into and out of the apparatus, and is available for buffering the data that does not enter or exit the apparatus via the switch port.

In a disclosed embodiment, the switch control unit is configured to reassign the at least one port buffer during configuration of the apparatus. In another embodiment, the switch control unit is configured to assess traffic traversing the apparatus, and to reassign the at least one port buffer responsively to the assessed traffic. In an embodiment, the switch ports, the switch fabric and the switch control unit are included in a single semiconductor device. In an alternative embodiment, the switch ports, the switch fabric and the switch control unit are included in a chip-set. In another embodiment, the given switch port is included in a line card.

In a disclosed embodiment, the part of the data that is forwarded via the at least one reassigned port buffer includes a multicast flow having respective branches, such that the destination switch port includes multiple destination switch ports corresponding to the branches, and the switch control unit is configured to route one or more of the branches directly to the respective destination switch ports. In an embodiment, the part of the data that is forwarded via the at least one reassigned port buffer is destined to a predefined group of the switch ports. In another embodiment, the part of the data that is forwarded via the at least one reassigned port buffer emanates from a predefined group of the switch ports.

There is additionally provided, in accordance with an embodiment of the present invention, a method for communication, including:

providing a network element that includes a plurality of switch ports, each switch port including one or more port buffers for buffering data that traverses the switch port, and a switch fabric that is coupled to transfer the data between the switch ports;

reassigning at least one port buffer of a given switch port to buffer a part of the data that does not enter or exit the network element via the given switch port; and after buffering the part of the data, causing the switch fabric to forward the buffered part of the data to a destination switch port via the at least one reassigned port buffer.

There is also provided, in accordance with an embodiment of the present invention, a computer software product used in a network element that includes a plurality of switch ports, each switch port including one or more port buffers for buffering data that traverses the switch port, and a switch fabric that is coupled to transfer the data between the switch ports, the product including a computer-readable medium, in which program instructions are stored, which instructions, when read by a computer, cause the computer to reassign at least one port buffer of a given switch port to buffer a part of the data that does not enter or exit the network element via the given switch port, and, after buffering the part of the data, to cause the switch fabric to forward the buffered part of the data to a destination switch port via the at least one reassigned port buffer.

The present invention will be more fully understood from the following detailed description of the embodiments thereof, taken together with the drawings in which:

DETAILED DESCRIPTION OF EMBODIMENTS

Figure 1:
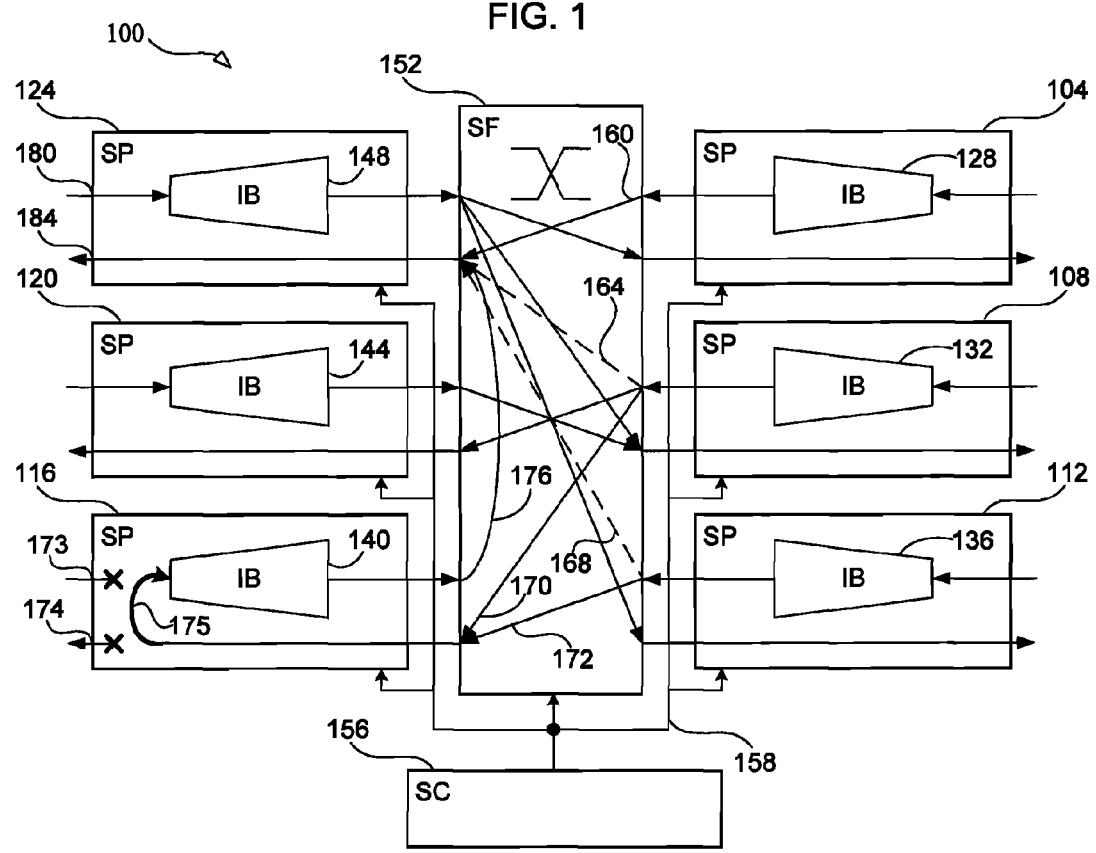
FIG. 1 is a block diagram that schematically illustrates loopback-mode operation in a data switch, in accordance with an embodiment of the present invention.

| ABBREVIATION TABLE | |
|---|---|
| IB | Input Buffer |
| LB | Loop-Back |
| OB | Output Buffer |
| SC | Switch Control |
| SF | Switch Fabric |
| SP | Switch Port |

Overview

Embodiments of the present invention provide improved data switching methods and devices for accommodating congestion in data switches (denoted "switches" herein for brevity). Such switches constitute the core of a broad class of network elements, e.g., Ethernet switches, IP routers and cross-connects. The term "data" relates in the present disclosure, in general, to data units that enter and exit the switch, as well as to data units that the switch handles internally. Thus, data may relate to packets, cells, segments, chunks or any other suitable data unit.

A typical switch configuration, in accordance with the disclosed techniques, comprises a Switch Fabric (SF), multiple Switch Ports (SPs) and a Switch Control (SC) unit. The SF routes data from source SPs to destination SPs according to routing commands that the SC provides to the SPs and the SF. A typical SP receives ingress data from the network, optionally stores the data in an Input Buffer (IB) and transfers the data to the SF. Such "storage and transfer" operation is denoted in the present disclosure as "handling". The SP also handles data in the egress direction, i.e., from the SF to the network, optionally through an Output Buffer (OB). This handling of bidirectional data that traverses the SP is denoted in the present disclosure as a "pass-through" transfer mode.

When the switch operates within a loaded network, congestion may occur when multiple SPs attempt to transfer data to a single SP or to a relatively small number of SPs. The SP typically comprises one or more port buffers for temporary storage of data that the SP is not capable of passing through due to congestion conditions. In a typical embodiment the port buffers comprise an Input Buffer (IB) and an Output Buffer (OB). However, in alternative embodiments the SP may comprise only one of those buffers. If congestion conditions persist in the switch for a long period of time, relatively to buffer size, some port buffers, typically IBs, may overflow.

Embodiments of the present invention that are described hereinbelow handle this potential problem by reassigning the port buffer of a given switch port to hold data that is destined for another port. In other words, the SC assigns the port buffer to hold data that does not enter or exit the switch via the given switch port. Once the congestion has been sufficiently relieved, the SC causes the switch fabric to forward this data to the appropriate destination switch port.

In a typical embodiment, buffer reassignment is implemented by configuring some SPs to handle data in an additional mode, denoted as a Loop Back (LB) transfer mode. When a given SP is configured to operate in the LB mode, at least one of its buffers serves as a shared buffer for other SPs in the switch, instead of being dedicated to network data that traverses the given SP in the pass-through mode. Thus, when the IB in another SP is close to overflow because part of its data is destined to a congested SP, the SC reroutes the data by commanding the other SP and the SF to transfer that data to the given SP for temporary storage in at least one of its port buffers, instead of transferring that data directly to its congested destination SP. At a later time, when the SF is capable of transferring that data to its destination SP, the SC will take care of commanding the given SP and the SF to transfer the rerouted data to its proper destination SP. Data that is conveyed to a given SP for temporary storage in the port buffering of the given SP, as described above, is denoted as "looped-back data".

Alternatively, temporary buffer reassignment may be implemented using other techniques to control the flow of data to and from the reassigned buffers, without necessarily resorting to LB within the SPs.

The disclosed techniques thus mitigate the adverse consequences of congestion events in the switch by flexibly allocating shared buffering capacity on demand. The shared buffers, in accordance with the disclosed techniques, are easily accessed by virtue of the SF connectivity, in particular when the SF connectivity is non-blocking. This flexible connectivity to the shared buffers features an access bandwidth that is potentially proportional to the number of switch ports, while it has no impact on the required access bandwidth of the individual shared buffers. Likewise, the shared buffer capacity that can be achieved using the disclosed techniques is potentially proportional to the number of switch ports, while exploiting port buffers that anyway exist in the switch. Management of the shared buffers is efficient since it is essentially identical to the management of the port buffers. In typical embodiments, the shared buffers provide the switch with useful features that the port buffers are commonly endowed with, such as efficient management of virtual output queues, quality of service levels, awareness of data flows and multicast stream replication.

System Description

FIG. 1 is a block diagram that schematically illustrates a data switch 100, in accordance with an embodiment of the present invention, wherein both the pass-through and the LB transfer modes are exemplified. The described switch can be used, for example, in Ethernet switches, IP routers, multiservice platforms, various transmission network elements, legacy communication equipment, or in any other suitable communication system. In the described embodiment, switch ports 104, 108 112, 116, 120 and 124 interchange data via a SF 152. For the sake of clarity, only six SPs are depicted in FIG. 1. The disclosed techniques, however, can be applied to switches of any number of SPs.

SF 152 serves to transfer the data between the SPs. In a typical embodiment, SF 152 comprises one or more interconnect circuits, which may be arranged in various switch fabric architectures, e.g., m*m crossbar, Banyan, Benes, Omega, Clos, multi-plane, STS, TST, shared memory, buffered crossbar, any other suitable blocking or non-blocking architecture, or any applicable mixed architecture thereof. SF 152 is realized in typical embodiments by hardware, which may comprise Field-Programmable Gate Arrays (FPGAs) and/or Application-Specific Integrated Circuits (ASICs), and in some implementations also bus interconnects.

A SC unit 156 controls the data routing between the SPs by monitoring the data pending for transfer at the SPs, and providing the SPs and the SF with appropriate routing commands for maximally efficient data transfer. The SC unit is realized in typical embodiments by hardware, which may comprise FPGAs and/or ASICs. The SC unit may also comprise a programmable element comprising one or more dedicated or general-purpose processors, which run software for carrying out the methods described herein. The software may be downloaded to the processors in electronic form, over a network, for example, or it may, alternatively or additionally, be provided and/or stored on non-transitory tangible media, such as magnetic, optical, or electronic memory. In alternative embodiments, SC unit 156 may be implemented as a logical unit within the SF. SC unit 156 communicates with the SPs and the SF through interconnect 158, which may comprise multiple point-to-point links or a shared bus.

The above-mentioned SPs 104, 108 112, 116, 120 and 124 comprise IBs 128, 132, 136, 140, 144 and 148, respectively. An example pattern of data flows between the SPs is exemplified in FIG. 1 by arrows that are drawn within SF 152. SP 108 interchanges bidirectional data with SP 120. In addition, SPs 104, 108 and 112 interchange bidirectional data with SP 124. FIG. 1 illustrates a congestion example wherein SP 124 cannot simultaneously absorb the incoming flows from SPs 104, 108 and 112, which are illustrated by flows 160, 164 and 168, respectively. Therefore, SC unit 156 needs to restrain the data emanating from IBs 128, 132 and 136, which would result in filling up of the IBs if the excess traffic flow toward SP 124 persists.

In order to avoid overflow of IBs 128, 132 and 136, SC unit 156 decides to virtually expand them by allocating IB 140 within SP 116 as a shared buffer for the above excess traffic flow. SC unit 156 realizes this expansion by rerouting flows 164 and 168 toward SP 116 instead of toward SP 124. This alternative routing is illustrated in FIG. 1 by flows 170 and 172, respectively, while the held-off flows 164 and 168 are depicted with dashed arrows.

SP 116 is configured in LB mode. This is realized by disconnecting an input port 173 and an output port 174 of SP 116 from the data that SP 116 receives from SF 152 and looping this data back to an input of IB 140. This loopback is depicted by an arrow 175 and is further detailed in FIG. 3 below. The data that pertains to flows 170 and 172 would thus be stored in IB 140 until SC unit 156 decides to allow SF 152 to transfer them to SP 124, as a flow 176. SP 124, like the other SPs in FIG. 1 besides SP 116, is configured in "pass-through" mode. Thus, SP 124 receives data from the network through an input port 180 and sends data flows 160 and 176 to the network through an output port 184.

Figure 3:
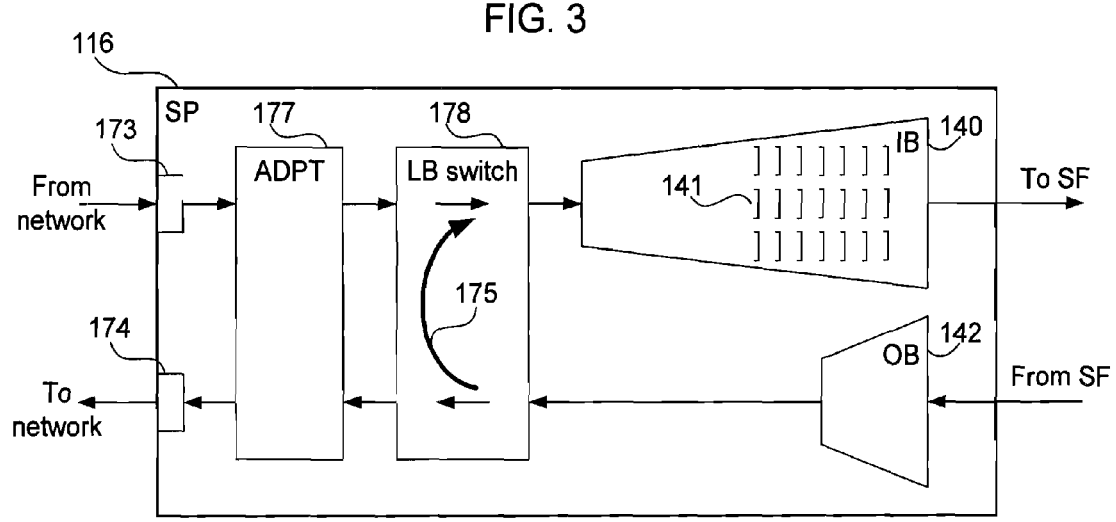
FIG. 3 is a block diagram that schematically illustrates a switch port, in accordance with an embodiment of the present invention.

The above example illustrates only one SP in LB mode in order to simplify the explanation of the disclosed techniques. In practice, any other SPs or SP groups could be configured to share buffers in the LB mode. Other port buffer configurations can be used in order to achieve the benefits of the disclosed techniques, e.g., using the OB instead of the IB, or using both the IB and the OB, as illustrated in FIG. 3 below.

The configuration of switch 100 shown in FIG. 1 is an example configuration, which is chosen purely for the sake of conceptual clarity. In alternative embodiments, any other suitable switch configuration can be used, for instance a switch with distributed control, a distributed architecture switch, a Time-Division Multiplexing (TDM) switch, a synchronous transmission network element, an optical switch or any other suitable switch configuration or type. In some embodiments, switch 100, including the SPs, the SF and the SC unit, are comprised in a single semiconductor device (e.g., a single chip of multi-chip package). Alternatively, the elements of switch 100 may be implemented using multiple devices. In an example embodiment of this sort, the SPs may be implemented in line cards.

Input Buffer Sharing Method

Figure 2:
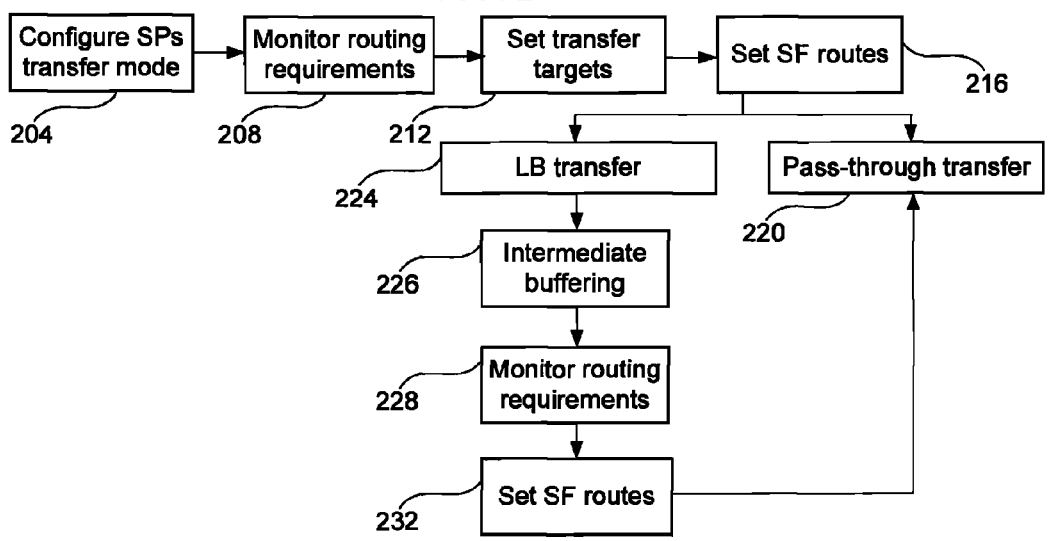
FIG. 2 is a flow chart that schematically illustrates a method for flexible sharing of a switch port buffer, in accordance with an embodiment of the present invention.

FIG. 2 is a flow chart that schematically illustrates a method for flexible sharing of SP buffers, in accordance with an embodiment of the present invention. The method begins with a configuration step 204, wherein some system administration entity, optionally by means of some network management system, configures each SP in the switch either in the "pass-through", in the LB transfer mode or in a mixed mode.

In the pass-through mode the SP handles, i.e., buffers and transfers, data that traverses the SP between the network and the SF. In the LB mode, on the other hand, the SP is disconnected from the network and its buffers are assigned for serving other SPs as shared buffers. The number of LB-configured SPs may depend, for example, on the overall traffic that the switch processes and the routing pattern and variability of the traffic. This number thus may change in response to traffic changes.

In some embodiments, the SP is configured in the mixed mode, wherein it supports both the pass-through and the LB modes concurrently. In this mode, the SP handles traversing data as well as looped-back data. The mixed transfer mode is typically applied to SPs in which the network traffic is sparse.

At a monitoring step 208, SC unit 156 monitors, through interconnect 158, the data that is pending for transfer in the SPs. At a target setting step 212, the SC unit examines the fill status of the buffers in the switch, as well as the current and estimated traffic requirements in the SPs, and updates the routing requirements of step 208 accordingly. More precisely, the unit determines for each pending data a target SP for the coming transfer cycle, wherein this target may be either the original destination of the data or an intermediate SP for LB mode transfer.

In some embodiments, the SC unit is aware of traffic flows, which are defined, for instance, by a source SP, a destination SP and a Quality of Service (QoS) class. A multicast stream typically constitutes a data flow as well. In particular, the SC unit avoids sequence integrity violation while rerouting data flows. For example, the SC unit may reroute a given flow to a first target SP for LB transfer. If a shared buffer in the first SP fills up, the SC unit will reroute the given flow to a second target SP for LB transfer. In order to avoid sequence integrity violation, the SC unit will later deplete the data of the given flow from the first target SP prior to depleting it from the second target SP. In some embodiments the SC unit may dedicate a given LB-mode SP to a predefined group of one or more output ports, to a predefined group of one or more input ports or to a mixed group thereof.

At a route setting step 216, SC unit 156 identifies and resolves transfer contentions and accordingly sets an actual routing pattern through SF 152 for the pending data. In some embodiments, SC unit 156 may use various arbitration algorithms at step 216, such as Parallel Iterative Matching (PIM), Round-Robin Matching (RRM), Iterative Serial-Line Internet protocol (iSLIP) or any other suitable algorithm that may be applicable to the architecture of SF 152. In alternative embodiments the arbitration algorithm may distinguish between various QoS levels and prioritize them according to a predefined order. In further alternative embodiments, steps 212 and 216 are interlinked at SC unit 156 for achieving more efficient routing decisions.

At a pass-through transfer step 220, SF 152 transfers pending data to its destination SPs for transmission to the network.

Additionally or alternatively, at a LB transfer step 224, SF 152 transfers the pending data to some given target LB-mode SP for intermediate buffering. At a buffering step 226 one or more buffers in each given target LB-mode SP store the data. In some embodiments the data is queued in Virtual Output Queues (VOQs) that are logically defined within a typical IB. When stored data reaches the head of its VOQ, SC unit 156 applies to it a second instance of steps 208 and 216, now respectively denoted 228 and 232. However, unlike in the first instance, route setting step 232 directly follows monitoring step 228 since there is no need to send data from a LB-mode SP to another LB-mode SP, although this may be done in some specific embodiments. A transition from step 232 to step 220 signifies an eventual transfer of the data to its destination SP after being buffered in some LB mode SP.

It should be clarified that the above flow chart is provided in the present disclosure as an example embodiment and alternative suitable step flows may be devised for the disclosed techniques.

Switch Port Configuration

FIG. 3 is a block diagram that schematically illustrates the configuration and operation of SP 116, as an example, in accordance with an embodiment of the present invention. In the pass-through transfer mode, the network provides SP 116 with ingress data through input port 173. An adaptation block 177 adapts the ingress data to the data type of the switch. A LB switch 178 passes the data to IB 140. IB 140 stores the data in VOQs 141 for transfer through SF 152 as detailed above. The VOQs serve to avoid head-of-line blocking. In some low-cost embodiments, IB 140 may not contain VOQs.

In the egress direction, SF 152 provides egress data to an OB 142. In various embodiments, the IB and OB can be of any size and, in particular, the IB can be smaller than, equal to or larger than the OB. The bandwidth in which the IB and OB interface with the SF is higher than the bandwidth in which they interface with the LB switch, thus achieving switching speedup. This is illustrated in FIG. 3 by wider sides of the IB and OB blocks that face the SF. The egress data then passes through LB switch 178 to adaptation block 177. The adaptation block typically converts the data to network packets and provides them to the network through output port 174.

In the LB transfer mode, LB switch 178 disconnects the ingress and egress network traffic, and loops the data at the output of OB 142 back to the input of IB 140, as illustrated by arrow 175. When configured in the LB mode, both the OB and the IB serve as shared buffers. SF 152 will transfer the loop-backed data after it has been queued in OB 142 and IB 140, as was detailed above. When SP 116 is configured to support the mixed transfer mode, LB switch 178 functions as an arbitrator: In the ingress direction it alternately provides IB 140 with network data coming from input port 173 and with LB data coming from the output of OB 142. In the egress direction LB switch 178 filters the data coming from OB 142 and provides output port 174 only with network data. In some embodiments that support the mixed transfer mode, some additional buffering, not shown in FIG. 3, is implemented between the network ports of SP 116 and LB switch 178 in order to absorb any temporary congestion at the input of IB 140. In an alternative embodiment, the SPs are comprised in line cards, which typically comprise additional circuitry for handling of the network traffic.

LB switch 178 is controlled by SC unit 156 (FIG. 1), so as to configure SP 116 in the pass-through mode, the LB mode or the mixed mode. As explained above, this configuration may be static (e.g., set during initial configuration of switch 100 and/or changed upon switch reconfiguration), or dynamic (e.g., changed automatically depending on traffic).

The above description has focused on the specific elements of SP 116 that are essential for understanding certain features of the disclosed techniques. Conventional elements of the SP that are not needed for this understanding have been omitted from FIG. 3 for the sake of clarity.

Multicast Flows

Figure 4A:
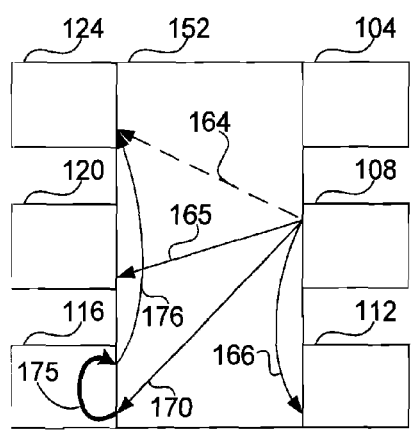
FIGS. 4A and 4B are flow diagrams that schematically illustrate routing of multicast streams within a data switch, in accordance with two embodiments of the present invention.
Figure 4B:
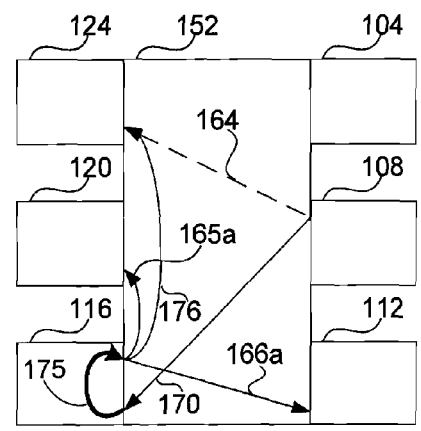

FIGS. 4A and 4B are flow diagrams that schematically illustrate routing of multicast data within data switch 100, in accordance with two example embodiments of the present invention. In FIG. 4A a multicast flow is shown emanating from SP 108 and creating branch flows 164, 165 and 166 to destination SPs 124, 120 and 112, respectively. The switch transfers flows 165 and 166 without rerouting. However, assuming that the congestion conditions of FIG. 1, which are not depicted in FIGS. 4A and 4B, still exist in the switch, SC unit 156 reroutes flow 164 to SP 116, as depicted by arrow 170. SP 116 loops back flow 170 as illustrated by arrow 175, for temporary buffering in IB 140. Then, when the congestion conditions allow, SF 152 transfers the looped-back flow to its proper destination SP 124, as depicted by arrow 176.

In an alternative embodiment, switch 100 handles multicast flows differently, as illustrated in FIG. 4B. Here, SF 152 does not replicate the multicast stream that emanates from SP 108 when at least one of its destinations, SP 124 in this example, is congested. This congestion is illustrated by dashed flow line 164. Instead, SF 152 transfers the multicast flow without replication to SP 116 as flow 170, for temporary buffering, until it is able to transfer all the multicast flows to their destination SPs. This replication is illustrated by flows 165a, 166a and 176, which respectively correspond to the original, held-off, flows 165, 166 and 164 of FIG. 4A.

Although the embodiments described herein mainly address data switches, the methods and systems exemplified by these embodiments can also be used in other applications, such as traffic control in data networks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication apparatus, comprising:
a switch fabric;
a plurality of switch ports interconnected by the switch fabric, each switch port comprising:
one or more port buffers, local to the switch port, for buffering data that is exchanged between the switch port and a network; and
a loopback switch for selectively disconnecting the port buffers of the switch port from the network and connecting the port buffers to the switch fabric in a loopback mode; and
a switch control unit, which is configured to control the loopback switch of the switch ports so as to reassign at least one port buffer of a given switch port to buffer a part of the data that does not enter or exit the apparatus via the given switch port by connecting the at least one port buffer to the switch fabric in the loopback mode, and to cause the switch fabric to forward the part of the data to a destination switch port via the at least one reassigned port buffer.

2. The communication apparatus according to claim 1, wherein the given switch port is further configurable to operate in a mixed mode, in which the given switch port is connected to convey a portion of the data into and out of the apparatus, and is available for buffering the data that does not enter or exit the apparatus via the switch port.

3. The communication apparatus according to claim 1, wherein the switch control unit is configured to reassign the at least one port buffer during configuration of the apparatus.

4. The communication apparatus according to claim 1, wherein the switch control unit is configured to assess traffic traversing the apparatus, and to reassign the at least one port buffer responsively to the assessed traffic.

5. The communication apparatus according to claim 1, wherein the switch ports, the switch fabric and the switch control unit are comprised in a single semiconductor device.

6. The communication apparatus according to claim 1, wherein the switch ports, the switch fabric and the switch control unit are comprised in a chip-set.

7. The communication apparatus according to claim 1, wherein the given switch port is comprised in a line card.

8. The communication apparatus according to claim 1, wherein the part of the data that is forwarded via the at least one reassigned port buffer comprises a multicast flow having respective branches, such that the destination switch port comprises multiple destination switch ports corresponding to the branches, and wherein the switch control unit is configured to route one or more of the branches directly to the respective destination switch ports.

9. The communication apparatus according to claim 1, wherein the part of the data that is forwarded via the at least one reassigned port buffer is destined to a predefined group of the switch ports.

10. The communication apparatus according to claim 1, wherein the part of the data that is forwarded via the at least one reassigned port buffer emanates from a predefined group of the switch ports.

11. A method for communication, comprising:
providing a network element comprising a switch fabric and a plurality of switch ports interconnected by the switch fabric, each switch port comprising one or more port buffers, local to the switch port, for buffering data that is exchanged between the switch port and a network, and a loopback switch for selectively disconnecting the port buffers of the switch port from the network and connecting the port buffers to the switch fabric in a loopback mode;
controlling the loopback switch of the switch ports so as to reassign at least one port buffer of a given switch port to buffer a part of the data that does not enter or exit the network element via the given switch port by connecting the at least one port buffer to the switch fabric in the loopback mode; and
after buffering the part of the data, causing the switch fabric to forward the buffered part of the data to a destination switch port via the at least one reassigned port buffer.

12. The method according to claim 11, wherein the given switch port is further configurable to operate in a mixed mode, in which the given switch port is connected to convey a portion of the data into and out of the apparatus network element, and is available for buffering the data that does not enter or exit the apparatus via the switch port.

13. The method according to claim 11, wherein reassignment of the at least one port buffer is performed during configuration of the network element.

14. The method according to claim 11, wherein reassigning the at least one port buffer comprises assessing traffic traversing the network element, and reassigning the at least one port buffer responsively to the assessed traffic.

15. The method according to claim 11, wherein the network element is comprised in a single semiconductor device.

16. The method according to claim 11, wherein the network element is comprised in a chip set.

17. The method according to claim 11, wherein the given switch port is comprised in a line card.

18. The method according to claim 11, wherein the part of the data that is forwarded via the at least one reassigned port buffer comprises a multicast flow having respective branches, such that the destination switch port comprises multiple destination switch ports corresponding to the branches, and wherein causing the switch fabric to forward the buffered part of the data comprises routing one or more of the branches directly to the respective destination switch ports.

19. The method according to claim 11, wherein the part of the data that is forwarded via the at least one reassigned port buffer is destined to a predefined group of the switch ports.

20. The method according to claim 11, wherein the part of the data that is forwarded via the at least one reassigned port buffer emanates from a predefined group of the switch ports.

21. A computer software product used in a network element comprising a switch fabric and a plurality of switch ports interconnected by the switch fabric, each switch port comprising one or more port buffers, local to the switch port, for buffering data that is exchanged between the switch port and a network, and a loopback switch for selectively disconnecting the port buffers of the switch port from the network and connecting the port buffers to the switch fabric in a loopback mode, the product comprising a non-transitory computer-readable medium, in which program instructions are stored, which instructions, when read by a computer, cause the computer to control the loopback switch of the switch ports so as to reassign at least one port buffer of a given switch port to buffer a part of the data that does not enter or exit the network element via the given switch port by connecting the at least one port buffer to the switch fabric in the loopback mode, and, after buffering the part of the data, to cause the switch fabric to forward the buffered part of the data to a destination switch port via the at least one reassigned port buffer.

* * * * *